June 3, 1930.   R. HASE   1,761,392
DEVICE FOR MEASURING THE TEMPERATURE OF HOT FLUIDS
Filed Dec. 15, 1924
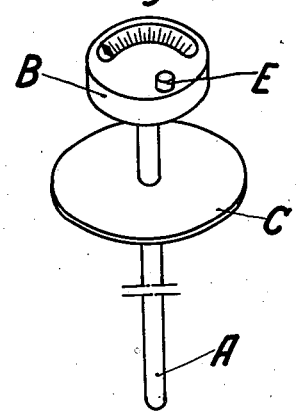
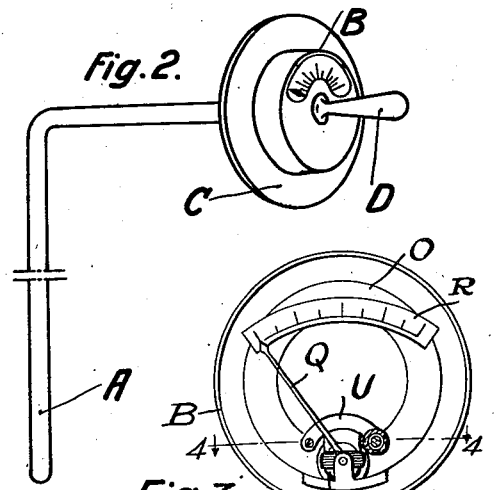
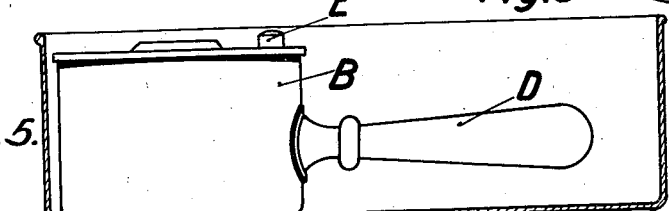
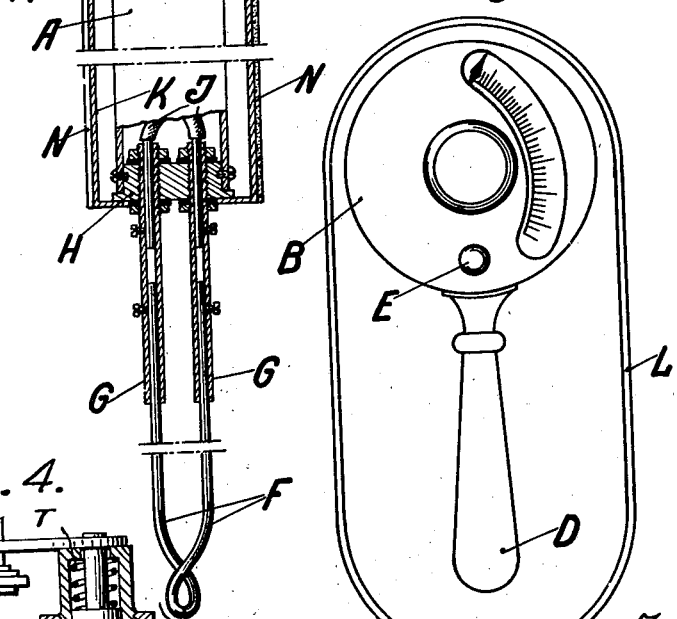
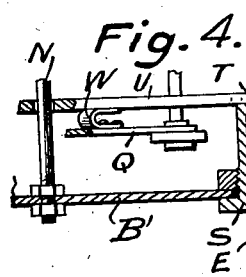
Inventor:
Rudolf HASE
by Lotz, Kehlenbeck & Farley
Attorneys Patented June 3, 1930

1,761,392

UNITED STATES PATENT OFFICE

RUDOLF HASE, OF HANOVER, GERMANY

DEVICE FOR MEASURING THE TEMPERATURE OF HOT FLUIDS

Application filed December 15, 1924, Serial No. 755,870, and in Germany January 28, 1924.

The devices usually employed for measuring the temperature of hot fluids, particularly of molten metals, by the aid of a thermo-couple, comprise three separate parts, namely an indicating instrument, the thermo-couple, and a cable connecting the instrument to the thermo-couple. The thermo-couple consists essentially of two wires of different metals soldered together at one end, and usually surrounded by a protecting tube to guard them from chemical action and mechanical injury. This tube is often of great length, as much as a metre, and has at one end two terminals for connection to the instrument leads.

Such an apparatus is very troublesome to handle. When it is desired to take the temperature of a metal or other molten material, it is first necessary to set up the sensitive indicating instrument exactly level upon a table, bracket or the like. Then the leads must be joined on the one hand to the instrument and on the other hand to the terminals of the tube containing the thermo-couple, care being taken that the polarity is right. Finally the tube with the thermo-couple is dipped into the crucible. The connecting cable is particularly troublesome, because it is easy to get caught in it, and if contact is interrupted by a break in it or if its insulation fails the operation of the instrument is interfered with.

Existing devices also need improvement in electrical respects. Since the resistance of the connecting leads is not known and is different in different cases, a steadying resistance must be put in series with the indicating instrument to diminish the effect of the resistance of the leads upon the indication as much as possible. But such a steadying resistance materially decreases the current through the instrument, which therefore must be made highly sensitive, which lessens its reliability and increases its cost.

These disadvantages are obviated simply and completely, according to the invention, by uniting the tube containing the thermo-couple with the indicating instrument in such fashion that the tube is fastened rigidly upon the case of the instrument. It is easy to make the whole device so robust that it can be placed among and dealt with like the usual tools of a foundry. It does not require a steadying resistance, because the thermo-couple can be connected directly to the instrument; and the sensitiveness of the instrument need not be specially high.

Three examples of construction of the new device are illustrated in the accompanying drawings.

Figures 1 and 2 show in perspective instruments in which the thermo-couple is surrounded by a protecting tube.

Fig. 3 is a plan view of Fig. 1;

Fig. 4 is a fragmentary section on an enlarged scale on the line 4—4 of Fig. 3;

Figure 5 shows a device with an exposed thermo-couple, partly in elevation and partly in section.

Figure 6 is a plan of Figure 5.

In the construction of Figures 1 and 2 the thermo-couple, not shown, is mounted within a tube A which may be straight or bent. The tube is made of fireproof and insulating material and is rigidly fastened to the case of the indicating instrument B. It is desirable to provide a shield C on the side of the instrument remote from the observer in close proximity to the instrument in order to protect the observer from the heat. The device is provided with an arresting device for the needle, which is preferably constructed in such a way that the needle is normally arrested and only then released when a push button E as shown in Figs. 1 and 5 is depressed. In the construction shown in Fig. 2 the case of the indicating instrument B is provided with a handle D on its front wall. The indicating instrument may be of any conventional form and as shown consists of a permanent magnet O and a rotatable armature P which carries the needle Q and shifts the latter relatively to a scale R. In the cover-plate $B^1$ of the head or casing B a bushing S is supported in which the push-button E is mounted, the latter being normally pressed outwardly by a spring T. At its inner end the push-button E carries a curved arm U which is located behind the needle Q and has its free end guided upon a rod N. Upon the rear surface of the needle Q a leafspring W is secured against which the arm U presses in its normal condition to prevent pivotal movement of the needle; the latter is released for movement only when the pressure of the arm U is removed from the spring W by an inward pressure on the push-button E.

To facilitate packing and transport and to enable the thermo-couple to be changed, the tube is preferably made readily detachable, as for instance by a screw connection, from the instrument case.

The upper part of the tube A, i. e. the part adjoining the indicating instrument may advantageously be made of a poor conductor of heat, in order both to protect the hand of the user from scorching, and to prevent or diminish as far as possible the warming up of the points of connection between the leads of the thermo-couple and the instrument through conduction.

The lower part of the tube A in which the hot end of the thermo-couple is enclosed, which must be dipped into the molten material in taking a temperature, is preferably made detachable or interchangeable, since it inevitably wastes away in time on account of the action of the molten material.

As is well known the E. M. F. of a thermo-couple depends upon the difference in temperature between the point where its two conductors are soldered together and the points between which the E. M. F. is measured. In the present case the latter are the points of connection of the leads of the thermo-couple to the indicating instrument. Therefore in order that the deflection of the instrument needle may be proportional to the temperature of the thermojunction care must be taken to keep the temperature of these points of connection as nearly constant as possible. This condition is substantially fulfilled by making the part of the tube next the instrument of a poor heat conductor, as already suggested. But if exact measurements are desired, or if it is necessary to leave the thermo-couple in the molten material a long time, some correction of the deflection is necessary.

In the construction of Figures 5 and 6 the tube A of electrically insulating material which conducts heat poorly, has at one end a head B which forms the case of the indicating instrument. Its needle may be clamped by means of a press button E. The device is held by the grip D which projects from one side of the case B. This grip should be so placed with respect to the button E that the button can be depressed by the thumb of the hand holding the grip.

The thermo-couple is formed of two wires F, soldered together at one end, and, detachably mounted in the tube A by their other ends.

For this purpose, in the construction of Figures 5 and 6 the end of the tube A is fitted with a closure H containing two metal tubes G insulated from each other. In these are fastened, but so as to be releasable, on the one hand the leads J to the instrument, and on the other hand the ends of the wires F.

To protect the user from the heat a shield is provided comprising a tubular part K and a pan L fastened together and to the case B by screws M. The part K has asbestos N wound about it, and the part L is wide enough to enable the grip D to be seized.

The measurement of the temperature of hot fluids, and particularly of molten metals, by means of thermo-coupler gives rise in some cases to great difficulties which have not hitherto been overcome. Many molten materials, particularly molten aluminium or aluminium alloys attack all metals and all silicates very vigorously. If any metal is dipped into molten aluminium or a molten aluminium alloy it is very soon dissolved. Similarly porcelain and all other silicates are soon dissolved when dipped into such liquids, and form a layer of slag floating on the top of the metal. Yet nothing but metal is available for the electrodes of the thermo-couple, and nothing but silicates for the material of the protecting tube of the thermo-couple. The tube cannot be made of carbon, because it is so poor a conductor of heat, and only slowly permits the thermojunction to assume the temperature of the molten material, or even prevents its reaching that temperature.

The fact that the graphite crucibles used for heating molten materials of the kind in question suffer comparatively little from contact with the molten material suggests that graphite may be used as a protecting sheathing for the thermo-couple or its tube.

It might be proposed to place the thermo-couple in a protecting tube of graphite extending as far as the device need to be dipped into the molten material in taking a temperature. Such a protecting tube of graphite would not, however, be practicable. The mechanical strength of graphite is too small to enable a tube of such material to withstand the rough handling to which such devices for dipping into molten material are exposed. Further the conductivity of graphite is so small that a comparatively long time must elapse between the dipping of the device into molten material and the attainment by the thermo-couple of the temperature of the molten material. Also when the device is withdrawn a certain amount of the molten material sticks to it and forms a layer of slag on cooling. This must be removed prior to the next measurement and the protecting tube would certainly be damaged during such removal.

According to the invention therefore a thin protecting sheathing of graphite is employed which is spread over the porcelain or other silicate protecting tube or upon the bare electrodes of the thermo-couple. This protecting coating is restored before each dip by rubbing in or dusting on, or otherwise applying graphite powder or by painting with a paste of graphite powder with any binding material. The coating is applied over the length which is to be dipped into the molten material. When the device is withdrawn there will be a certain amount of molten material adhering to it which soon cools to a crust of slag. This is not stuck fast to the protecting tube or electrodes; it is easily removed since it is carried only by the thin graphite coating which is itself not firmly adherent.

I claim:

1. A portable device for measuring the temperature of hot liquids by dipping it into the liquid, comprising an electrical indicating instrument including a case, a tube projecting from the case of said instrument, a holder at the free end of said tube, a thermo-couple, means for detachably securing said thermo-couple in said holder, and leads within said tube for connecting said thermo-couple to said instrument.

2. A portable device for measuring the temperature of hot liquids by dipping it into the liquid, comprising an electrical indicating instrument including a case, a tube projecting from the case of said instrument, a holder at the free end of said tube, metal sockets provided in said holder and insulated therefrom, a thermo-couple, means for detachably securing said thermo-couple in said sockets, and leads within said tube connecting said thermo-couple to said instrument.

3. A portable device for measuring the temperature of hot liquids by dipping it into the liquid, comprising an electrical indicating instrument including a case, a tube projecting from the case of said instrument, a shield about said tube near said instrument, a holder at the free end of said tube, a thermo-couple, means for detachably securing said thermo-couple in said holder, and leads within said tube connecting said thermo-couple to said instrument.

4. A portable device for measuring the temperature of hot liquids by dipping it into the liquid, comprising an electrical indicating instrument including a case, a handle upon the case of said instrument, a tube projecting from said case, a shield upon said tube extending outwardly therefrom beyond the instrument and the handle, a holder at the free end of said tube, a thermo-couple, means for detachably securing said thermo-couple in said holder, and leads within said tube connecting said thermo-couple to said instrument.

5. A portable device for measuring the temperature of hot liquids by dipping it into the liquid, comprising an electrical indicating instrument including a case, a tube projecting from the case of said instrument, a holder at the free end of said tube, a thermo-couple, means for detachably securing said thermo-couple in said holder, leads within said tube connecting said thermo-couple to said instrument, and a graphite coating covering the part which is dipped into the liquid.

In testimony whereof I have affixed my signature.

RUDOLF HASE.